(12) United States Patent
Gallon

(10) Patent No.: US 11,461,763 B2
(45) Date of Patent: Oct. 4, 2022

(54) SYSTEMS AND METHODS FOR INSTANT BANK CARD ISSUANCE

(71) Applicant: Capital One Services, LLC, McLean, VA (US)

(72) Inventor: Nicole Gallon, Hopewell, VA (US)

(73) Assignee: Capital One Services LLC, McLean, VA (US)

( * ) Notice: Subject to any disclaimer, the term of this patent is extended or adjusted under 35 U.S.C. 154(b) by 132 days.

(21) Appl. No.: 16/851,005

(22) Filed: Apr. 16, 2020

(65) Prior Publication Data
US 2021/0326839 A1  Oct. 21, 2021

(51) Int. Cl.
*G06Q 20/34* (2012.01)
*G06K 19/07* (2006.01)

(52) U.S. Cl.
CPC ......... *G06Q 20/34* (2013.01); *G06K 19/0723* (2013.01)

(58) Field of Classification Search
CPC ........................... G06Q 20/34; G06K 19/0723
USPC ............................................ 705/41; 235/380
See application file for complete search history.

(56) References Cited

U.S. PATENT DOCUMENTS

| | | | |
|---|---|---|---|
| 6,877,656 B1* | 4/2005 | Jaros ...................... | G06Q 20/04 235/380 |
| 10,778,681 B1* | 9/2020 | Douglas .............. | H04L 63/0861 |
| 2003/0154406 A1* | 8/2003 | Honarvar ........... | G06Q 20/4014 726/10 |
| 2010/0123002 A1* | 5/2010 | Caporicci .............. | G06Q 20/22 235/380 |
| 2011/0101109 A1* | 5/2011 | Bona ................. | G06K 19/07705 235/492 |
| 2012/0016797 A1* | 1/2012 | Smith ..................... | G06Q 40/02 705/41 |
| 2016/0294820 A1* | 10/2016 | Douglas-Middleton ..................... | H04L 63/0853 |
| 2019/0281036 A1* | 9/2019 | Eisen ............... | G06Q 20/40145 |
| 2021/0073791 A1* | 3/2021 | Boelle ................. | G06Q 20/355 |

* cited by examiner

*Primary Examiner* — Allyson N Trail
(74) *Attorney, Agent, or Firm* — Finnegan, Henderson, Farabow, Garrett & Dunner, LLP

(57) ABSTRACT

Systems and methods for instant issuing of a transaction card, controlling issuing of the instant transaction card, and customization of the transaction card. A system includes at least one processor and a storage medium storing instructions that, when executed by the one or more processors, cause the at least one processor to perform operations including receiving a request to issue a card and directing the customer to insert an identification card. Proceeding with capturing identification and biometric data identifying the customer and verifying the captured identification and biometric data. The operations also include determining whether a combination of the available customer data and the received biometric data is sufficient to verify customer identity. When the combination data are sufficient to verify customer identity, the operations further include issuing a transaction card. The operations further include capturing an image of the customer and issuing a customized transaction card to the customer.

20 Claims, 5 Drawing Sheets

SYSTEMS AND METHODS FOR INSTANT BANK CARD ISSUANCE

TECHNICAL FIELD

The present disclosure generally relates to computerized systems and methods for instant bank card issuance. In particular, embodiments of the present disclosure relate to inventive and unconventional systems for instant issuing of a transaction card, controlling issuing of the instant transaction card, and customization of the transaction card.

BACKGROUND

Currently, if a new or replacement transaction card is desired it is necessary to apply through a bank and wait for the card to be received in the mail. Transaction cards may include credit cards, debit cards, loyalty program cards, ATM cards, or any other type of card used conducting a commercial transaction, including cards having an EMV chip. An application for a new transaction card may be submitted in person or electronically, but regardless of how the application is received, the applicant must wait until the card is received in the mail. Mailing a card takes time, and customer is unable to use the card until it is received and activated. Even if an existing card is compromised or stolen, customers are forced to wait until a replacement card is delivered to them in the mail.

Current approaches exhibit a number of problems. Cards are typically mailed to the billing address of the customer, regardless of from where the application is made. Thus, if the customer is traveling, he will not be able to receive a new or replacement card until he returns to the location of the billing address. Card issuers therefore lose money every day customer is using another bank card. Thus, card issuers often incur the extra expense of overnight delivery.

Therefore, there is a need for improved methods and systems for instant issuing of a transaction card.

SUMMARY

One aspect of the present disclosure is directed to a system for instant issuing of a transaction card, including at least one processor; and at least one memory storing instructions that, when executed by the at least one processor cause the system to perform operations. The operations include receiving a customer request to issue a transaction card and directing the customer to insert an identification card. The operations also include capturing identification data from the identification card and capturing biometric data identifying the customer. The operations further include verifying the captured identification and biometric data; and if verification is successful, ejecting the identification card and issuing a transaction card.

Another aspect of the present disclosure is directed to a system for controlling issuing of an instant transaction card, including at least one processor; and at least one memory storing instructions that, when executed by the at least one processor cause the system to perform operations. The operations include receiving data captured by a card issuing system and determining whether customer data corresponding to the received data is available in an internal database. When customer data corresponding to the received captured data is available in the internal database, the operations also include determining whether the available customer data is sufficient to verify customer identity. When the available customer data is not sufficient to verify customer identity, the operations also receiving biometric data from the card issuing system. The operations further include determining whether a combination of the available customer data and the received biometric data is sufficient to verify customer identity. When the combination data are sufficient to verify customer identity, the operations further include sending the card issuing system instructions to issue a transaction card.

Yet another aspect of the present disclosure is directed to customization of a transaction card, including at least one processor; and at least one memory storing instructions that, when executed by the at least one processor cause the system to perform operations. The operations include receiving a customer request for customization of the transaction card and directing a customer to move to a designated area. The operations also include capturing an image of the customer; displaying the image to the customer; and requesting customer approval of the image. Upon receiving the approval, the operations further include issuing a customized transaction card to the customer.

Other systems, methods, and computer-readable media are also discussed herein.

DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Embodiments of the present disclosure are directed to systems and methods configured for instant issuing of a transaction card, controlling issuing of the instant transaction card, and customization of the transaction card.

Figure 1:
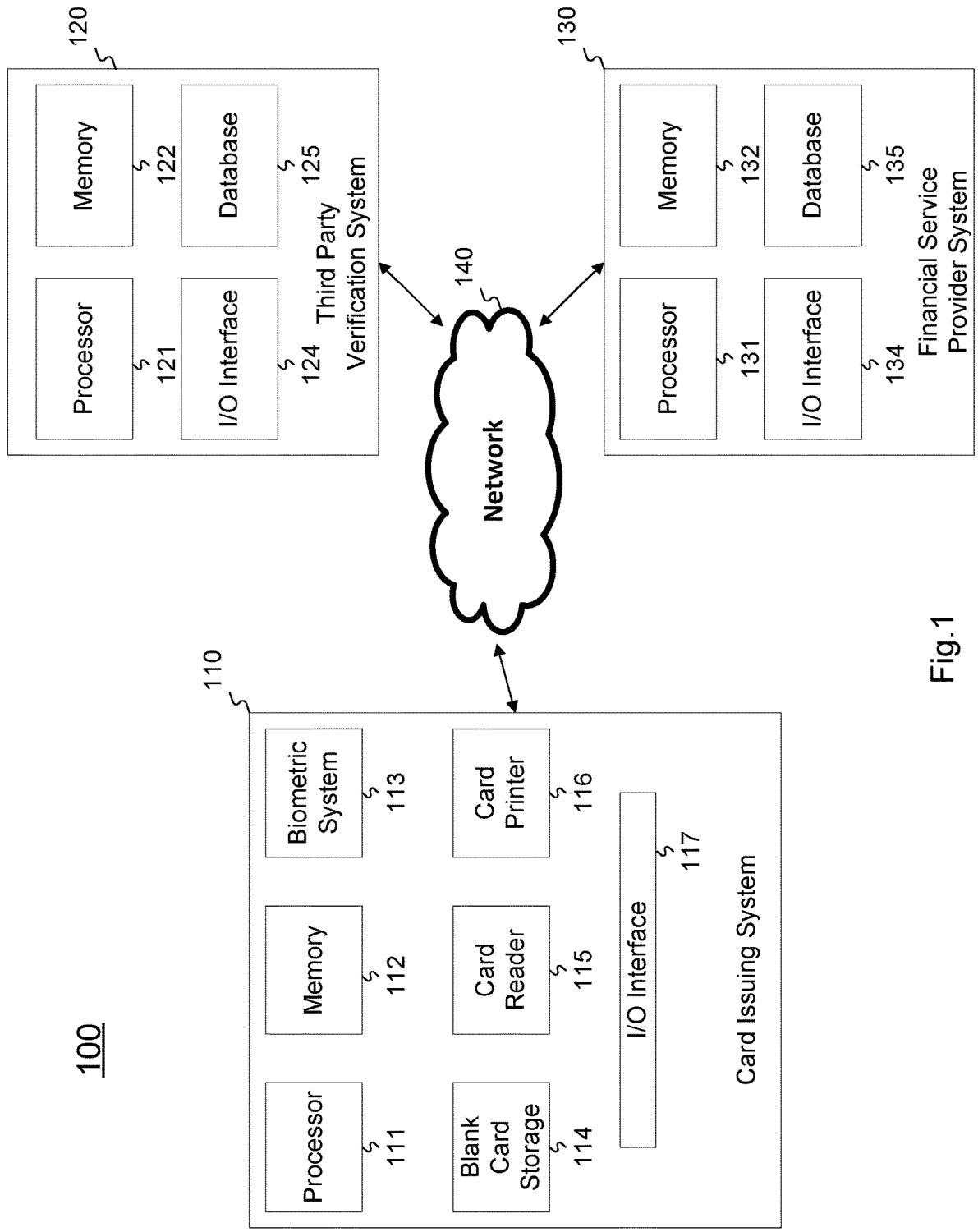
FIG. 1 is a schematic block diagram of an exemplary system for performing instant issuance of a transaction card, controlling issuance of the instant transaction card, and customizing the transaction card, consistent with disclosed embodiments.

FIG. 1 is a schematic block diagram of an exemplary embodiment of a system 100 for performing instant issuing of a transaction card, controlling issuing of the instant transaction card, and customization of the transaction card. As shown in FIG. 1, system 100 may include a variety of components and subsystems, each of which may be connected to one another. System 100 is not limited to the depicted exemplary embodiment and may comprise additional computerized systems, working in tandem, and connected via network 140. The components and subsystems may also be connected to one another via a direct connection, for example, using a cable.

System 100 includes a card issuing system 110, a third party verification system 120, and a financial service provider system 130 respectively comprising processors 111, 121, and 131; memories 112, 122, and 132; and I/O interfaces 117, 124, and 134. Processors 111, 121, 131 may comprise a microprocessor, including a central processing unit (CPU), a graphics processing unit (GPU), or other electronic circuitry capable of carrying out the instructions of a computer program by performing the operations specified by instructions stored in a memory 112, 122, 132. Alternatively, or concurrently, processors 111, 121, 131 may comprise one or more special-purpose devices built according to embodiments of the present disclosure using suitable circuit elements, e.g., one or more application-specific integrated circuits (ASICs), field-programmable gate arrays (FPGAs), or the like. Memories 112, 122, 132 may comprise volatile memory, such as random-access memory (RAM), a non-volatile memory, such as a hard disk drive, a flash memory, or the like, or any combination thereof.

Card issuing system 110 includes a biometric system 113. Biometric system 113, may include any suitable hardware or software solutions for capture and verification of various types of biometric information such as, for example, signature recognition, fingerprint recognition, voice verification/authentication, vein recognition, typing recognition, scent/odor recognition, hand geometry recognition, gait recognition, finger geometry recognition, fingerprint recognition, face recognition, iris/retina recognition, etc.

Card issuing system 110 further includes a blank card storage 114. Blank card storage 114 may comprise any suitable hardware for storing blank transaction cards.

Card issuing system 110 further includes a card reader 115 having any suitable hardware to read information on a transaction card. Card reader 115 may further include necessary technology to employ multiple levels of security, e.g. black light detection, high-resolution scanning, etc.

Card issuing system 110 further includes a card printer 116 having any suitable hardware for production of transaction cards. EMV chips on transaction cards may be pre-encoded or encoded by the card printer 116.

Third party verification system 120 and financial service provider system 130 further respectively include databases 125 and 135. Databases 125 and 135 may each include any suitable hardware or software solutions for an organized collection of data.

I/O interfaces 117, 124, 134 may comprise any suitable hardware or software solution for input/output of data. I/O operations may be accomplished through a wide assortment of external devices that provide a means of exchanging the data via inputs and outputs between the external environment and respective subsystem 110, 120, 130.

System 100 further includes a network 140. Network 140 may be any type of network that facilitates communications and data transfer between components of a system environment. Network may be a Local Area Network (LAN), a Wide Area Network (WAN), such as the Internet, and may be a single network or a combination of networks. Further, network 140 may reflect a single type of network or a combination of different types of networks, such as the Internet and public exchange networks for wireline and/or wireless communications. Network 140 may use cloud computing technologies. Network is not limited to the above examples and system 100 may implement any type of network that allows the components and entities (not shown) included in FIG. 1 to exchange data and information.

Figure 2:
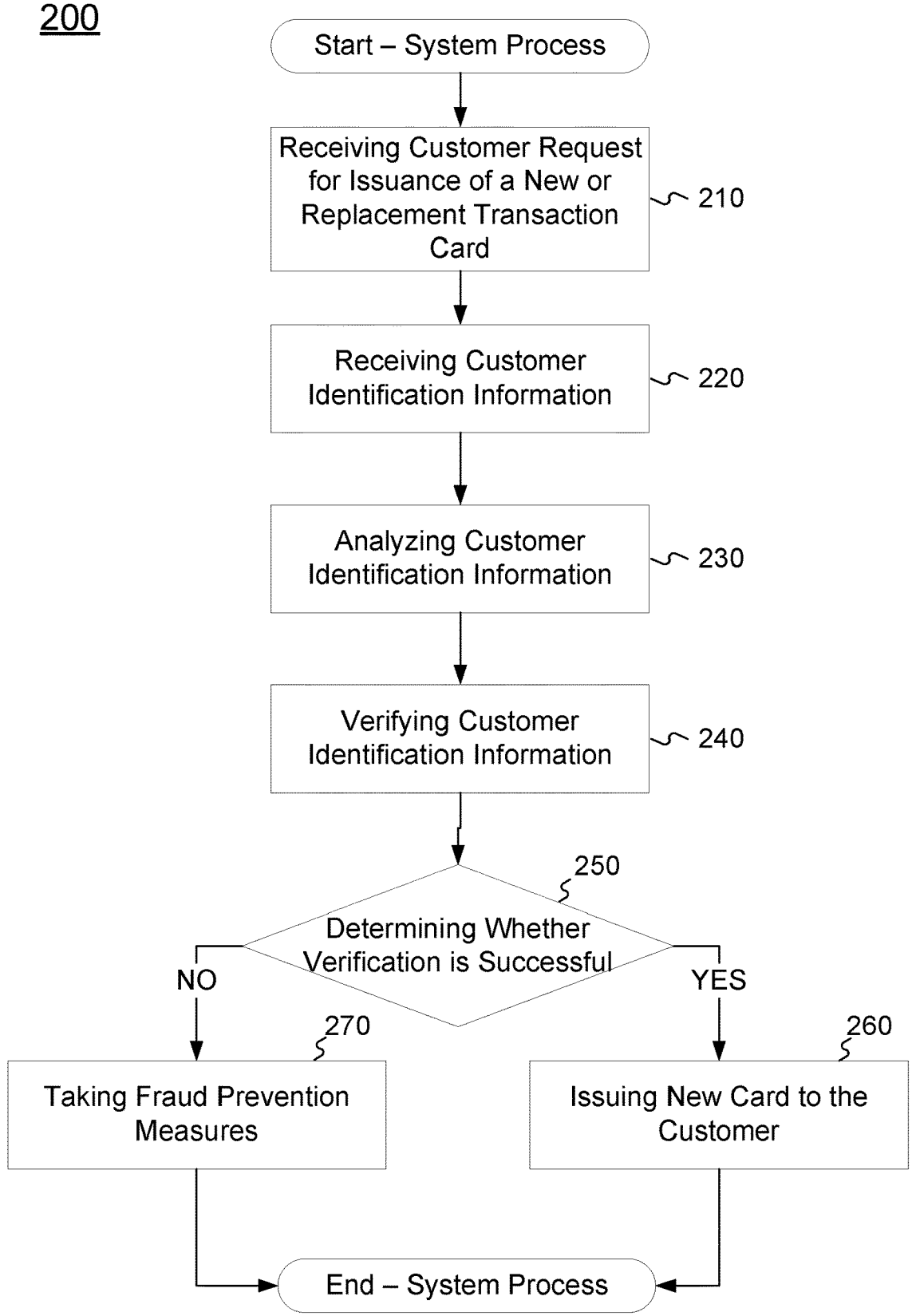
FIG. 2 is a flow chart of an exemplary method for instant issuance of a transaction card, by system of FIG. 1, and consistent with the disclosed embodiments.

FIG. 2 is a flow chart of a process 200 for issuing a transaction card to a customer. Process 200 starts at step 210 by receiving a customer request for issuance of a new or replacement transaction card. The customer request may be based on a new application or on an earlier existing application. In the event the request is based on an earlier application, the customer may be prompted for a reference number. The request must identify whether the customer is seeking to open a new transaction card or is seeking replacement of an existing card. Replacement may be requested due to damage, loss, or suspected fraud on the existing card. Alternatively, replacement may be requested if customer is unhappy with the current design of the card and would like to have a card customized, as described in more detail in FIG. 5.

Process 200 then proceeds to step 220. In step 220, system 100 receives customer-identifying information. Customer-identifying information may include data from an ID card, such as driver's license, school ID, passport, etc. Customer-identifying information is not limited to the information received from the ID card and may further include biometric and behavioral identifying information.

Process 200 then proceeds to step 230, where system 100 analyzes the customer identifying information. Analysis may be performed based on the information stored in database 135 of the financial service provider system 130. Based on the result of the analysis, it may be determined that financial service provider system 130 does not contain enough information, and third party verification system 120 may be contacted to provide additional information necessary for the next step 240, verification.

In step 240, system 100 verifies the customer identification information. If the result of the analysis performed in step 230 indicates that additional information is required for verification, third party verification system 120 may be contacted. For example, a Department of Motor Vehicles (DMV) database may be contacted to verify driver's license information, or a partner bank may be contacted for additional information regarding the customer.

At step 250 it is determined whether verification of the customer is successful. If so (step 250=YES), process 200 proceeds to step 260, where a new transaction card is issued. In the event of reissuance, an old transactional card may be collected.

In the event that verification is not successful (step 250=NO), process 200 proceeds to step 270 where if an ID provided by the customer is determined to be fraudulent, the ID may be collected, a fraud department may be alerted, and law enforcement may be contacted. All identification information collected during process 200 is further stored for future use by the financial service provider system 130.

Figure 3:
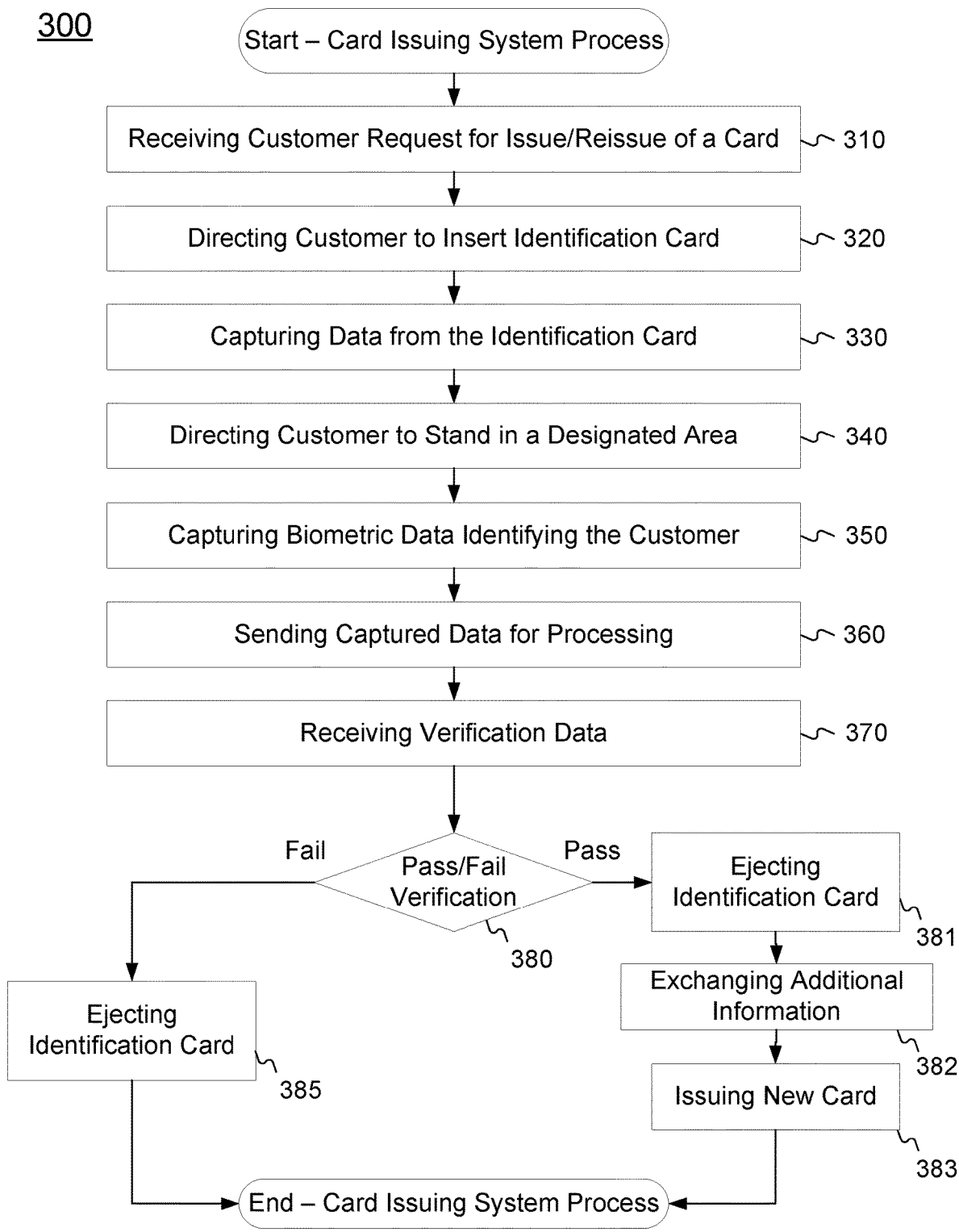
FIG. 3 is a flow chart of an exemplary method for instant issuance of a new or replacement transaction card by a card issuing system, consistent with the disclosed embodiments.

FIG. 3 is a flow chart of a process 300 for issuing a new or replacement transaction card by the card issuing system 110. Process 300 starts at step 310 by receiving customer request for issuance of a new/replacement transaction card. The request is received by I/O Interface 117 of the card issuing system 110. This step is similar to the step 210 of process 200 described earlier and is consistent with the earlier disclosure.

Process 300 then proceeds to step 320. In step 320, card issuing system 110 directs a customer to insert an identification card in a card reader 115. Insertion directions may be displayed via I/O Interface 117. Directions may include types of acceptable identifications, required card orientation, location of the card reader, etc. Directions may change based on the unsuccessful attempts to insert an identification card. For example, if customer inserts an identification card upside down, directions might be altered specifically to guide the customer to flip an identification card before reinserting it into a card reader 115.

Process 300 then proceeds to step 330, where the card issuing system 110 captures ID data from the identification card by, for example, card reader 115. Data may include a scanned image of the identification card and or information displayed on the card, such as legal name, residential address, birth date, gender, driver's license or identification number, digital front-facing photograph, signature, etc. ID data may further include any information embedded in the identification card, e.g. biometric information, security codes, etc. Capture of ID data may vary based on the type of identification card. A security level of the identification card may also be recorded. For example, a driver's license will have a higher security level as compared to a student ID. Different states have different standards for driver's licenses and security level may vary accordingly. Similarly, newer Real ID licenses will have a higher security standard compare to earlier issued licenses. Various security features may be assessed during the capture process.

Card reader 115 may be equipped with the necessary technology to identify multiple levels of security, by capturing overt features easily visible to the naked eye, like a color cardholder photo or signature, and covert features visible only with the use of additional equipment, such as UV light, and high magnification to identify microscopic features often used to differentiate between legitimate identification cards and fake identification cards. Other types of security features include micro text, ghosted images, holographic background images, laminates with holographic images, embedded technology, UV text or images, official seals, thermochromic printing, opacity printing, embossed printing, etc.

Process 300 then proceeds to step 340, where the card issuing system 110 directs a customer to stand in a designated area. Directions may be displayed via I/O Interface 117. Directions may include arrows, a schematic outline of the designated area, voiced guidance, etc. Directions may change based on the unsuccessful attempts to stand in the designated area. For example, if customer is standing too close, card issuing system 110 may audibly ask customer to take a step back. Another example is if a voiceprint is being captured, card issuing system 110 may ask customer to repeat the phrase several times with different volumes.

Process 300 then proceeds to step 350, where the card issuing system 110 captures biometric data identifying the customer. I/O Interface 117 of card issuing system 110 may include necessary technology to perform the capture. Behavioral characteristics may be also captured. As used herein, behavioral characteristics may relate to a person's pattern of behavior including, for example, typing rhythm, gait, word choice, etc. Data capture is further explained below with respect to FIG. 3. For example, if the identification card used in steps 310-330 contains a photo, a customer may be asked to take a "selfie" for verification.

Process 300 then proceed to step 360, where card issuing system 110 sends data captured in steps 330 and 350 for processing to financial service provider system 130. This step may be performed multiple times, as necessary. For example, data may first be sent immediately after step 330 and again after step 350.

Process 300 then proceeds to step 370, where the card issuing system 110 receives verification data from financial service provider system 130. Financial service provider system 130 may have contacted third party verification system 120 as described in the process 200 to confirm verification information. Verification data indicates whether verification of the customer passed or failed 380.

If verification is successful, process 300 proceeds to step 381, where card issuing system 110 ejects the identification card from the card reader 115. Step 282 where additional information (e.g., issuance information, identification card details, etc.) is exchanged with the financial service provider system 130. Process 300 concludes a step 383, where a new card is issued to the customer.

If verification fails, process 300 proceeds to step 385, where the card issuing system 110 may eject the identification card. Alternatively, if the identification card is determined to be fraudulent, the identification card may be collected, a fraud department alerted, and law enforcement contacted.

Figure 4:
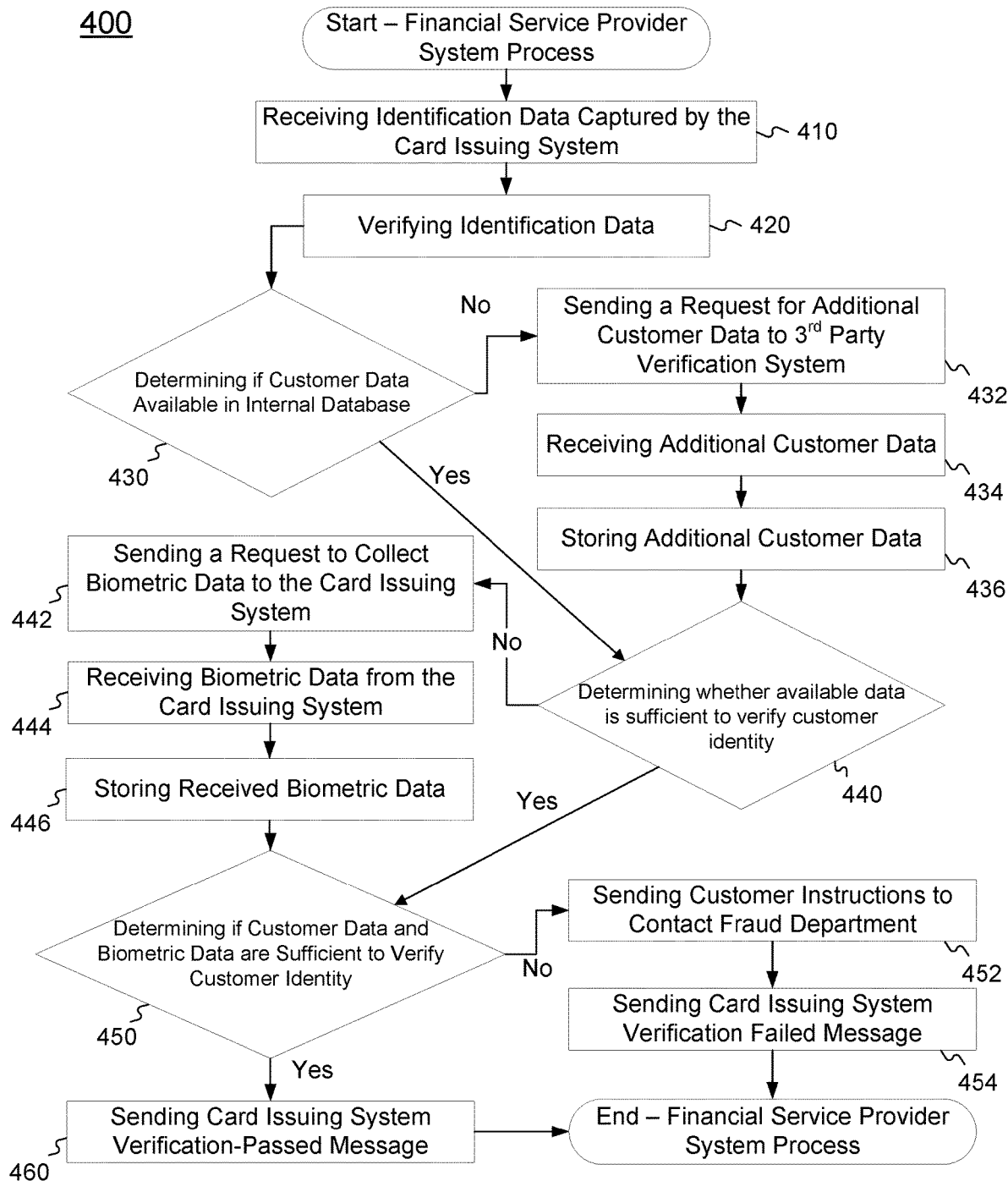
FIG. 4 is a flow chart of an exemplary method for controlling issuance of the instant transaction card, consistent with the disclosed embodiments.

FIG. 4 is a flow chart of a process 400 for controlling issuance of an instant transaction card by financial service provider system 130. Process 400 starts at step 410 by receiving captured data from card issuing system 110. The process of capturing data by the card issuing system 110 is as described earlier in process 300 of FIG. 3. Types of captured data are as described earlier and may include data captured from an identification card of a customer as well as biometric data captured by card issuing system 110.

Process 400 then proceeds to step 420. In step 420, financial service provider system 130 begins verification of the identification data. Step 420 may include preliminary checks, such as verification that all data sent by card issuing system 110 was received by financial service provider system 130 and whether any data is missing or corrupted. In the event of corrupted or missing data, financial service provider system 130 may request card issuing system 110 to retransmit the data. If data is successfully verified it may proceed to further, more advanced verification steps.

Process 400 then proceeds to step 430, where financial service provider system 130 determines if customer data is available in internal database 125. The determination process may determine whether all or portion of the data related to the customer is available. Final decision regarding availability may be determined based on a preset parameter for key data points. For example if the name of the customer is known but no other information is available, the system will treat determination process as failed and will process as if customer data is not available.

In the event the financial service provider system 130 determines that there is insufficient customer data in the internal database 125, process 400 proceeds to step 432. In step 432 financial service provider system 130 sends a request for additional data to third party verification system 120. Additional data identified in the request may include a combination of data known and not known to the system. Decision on which data to request may be made based on multiple factors, such as confidence in the accuracy of the data, age of the known data, importance of the data, etc. Multiple requests may be made to different third party verification systems. For example, a request regarding driver license information may be made to a local DMV, and a request for credit history may be made to a credit reporting agency. Requested data may further include biometrics data.

After a request is made, process 400 proceeds to steps 434 and 436, where financial service provider system 130 receives and stores requested information from third party verification system 120. Received information may be compared to the information received from card issuing system 110 and to the information already stored in internal database 125. Duplicate information may be treated based on the preset priority parameters, e.g. information received from government sources always overrides existing information, or information received form partner financial systems may be judged based on age of the information, with newer information getting a priority.

After received information is stored or in the event the financial service provider system 130 determined that there is already sufficient amount of data available in the internal database 125 process 400 proceeds to step 440. In step 440, financial service provider system 130 determines if all information in the internal database, which may include newly collected data, is sufficient to make a verification decision. Determination may be made based on the preset parameters. In one embodiment, a component confidence parameter may be utilized wherein each component of collected data is assigned a confidence value and if total confidence value reaches certain threshold then verification is deemed successful.

In the event financial service provider system 130 determines that there is not enough data collected to make a verification determination, process 400 proceeds to step 442. In step 442, financial service provider system 130 sends a request to collect biometric data to card issuing system 110. Collection of biometric data by card issuing system 110 is described earlier in reference to process 300 of FIG. 3. Types of biometric data that may be requested are previously described.

After a request is made, process 400 proceeds to steps 444 and 446, where financial service provider system 130 receives and stores requested information from card issuing system 110. New data is stored in internal database 125 and may be used in the future.

After received information is stored or in the event the financial service provider system 130 determined that there is already enough data available in the internal database 125 process 400 proceeds to step 450. In step 450, financial service provider system 130 determines if customer data together with biometric data are sufficient to verify customer identity. This determination may be made based on the preset parameters. In one embodiment, a component confidence parameter may be utilized wherein each component of collected data is assigned a confidence value and if a total confidence value reaches certain threshold, then data is deemed sufficient.

In the event the financial service provider system 130 determines that there is not enough data to verify customer identity, process 400 proceeds to step 452. In step 452, financial service provider system 130 send instructions to a customer to contact a fraud department. Instructions may be sent via a contact method on file, e.g. email, text, telephone, etc. Process 400 then proceeds to step 452, where financial service provider system 130 sends a "Verification Failed" message to card issuing system 110. The "Verification Failed" message may include a specific reason why the verification failed.

Alternatively, in the event the financial service provider system 130 determines that there is enough data to verify customer identity, process 400 proceeds to step 460. In step 460, financial service provider system 130 sends a "Verification Passed" message to card issuing system 110.

Figure 5:
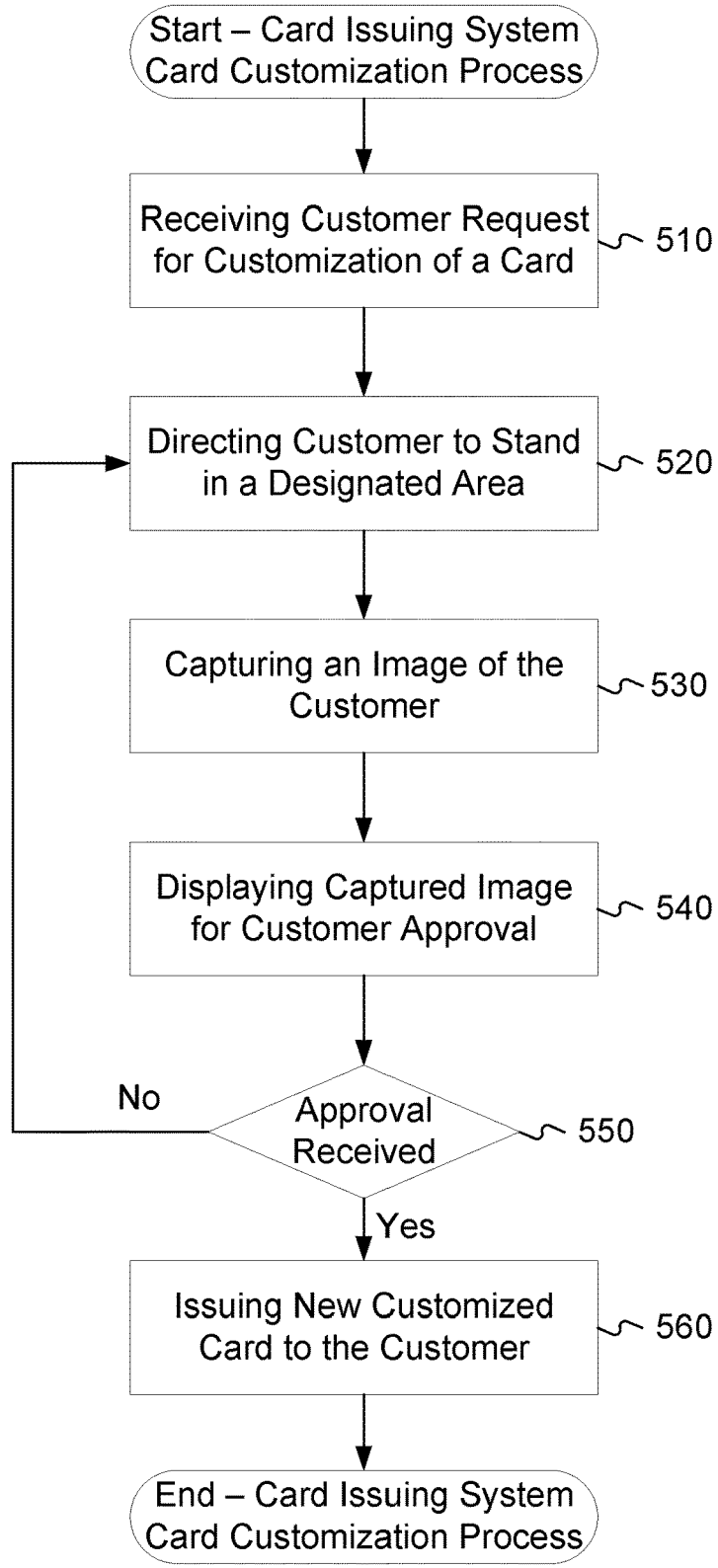
FIG. 5 is a flow chart of an exemplary method for customization of the transaction card, consistent with the disclosed embodiments.

FIG. 5 is a flow chart of a process 500 for customization of the transaction card. Process 500 starts at step 510 where card issuing system 110 receives a customer request for customization of a card. The request may include a selection of a template or custom uploaded image, and may be made during issuance of a new or replacement card, as previously described.

Process 500 then proceeds to step 520, where card issuing system 110 send directions to the customer to stand in a designated area to capture an image to be embossed on the custom transaction card. Directions may include arrows, a schematic outline of the designated area, voiced guidance, etc. Directions may change based on unsuccessful attempts to stand in the designated area.

Process 500 then proceeds to step 530, where card issuing system 110 captures an image of the customer and displays the captured image to the customer in the following step 540. While the image is displayed to the customer, customer may make edits to the captured image. Edits may include resizing the captured image, cropping the captured image, rotating an image, etc. The customer may then send an approval of the captured image or recapture an image. If approval is received by card issuing system 110, process 500 continues to step 560, where the customer is issued a new customized transaction card. The captured image may further be saved and used for biometrics verification.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

It is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

The foregoing description is presented for purposes of illustration. It is not exhaustive and is not limited to the precise forms or embodiments disclosed. Modifications and adaptations of the embodiments will be apparent from consideration of the specification and practice of the disclosed embodiments.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for instant issuing of a transaction card, comprising:
   at least one processor; and
   at least one memory storing instructions that, when executed by the at least one processor cause the system to perform operations comprising:
   receiving a customer request to issue a transaction card;
   directing the customer to insert an identification card;
   capturing identification data and a security level associated with the identification card;
   capturing biometric data identifying the customer;
   verifying the captured identification and biometric data; and
   if verification is successful, ejecting the identification card and issuing a transaction card.

2. The system of claim 1 wherein the operations further comprise capturing the identification card if verification is not successful.

3. The system of claim 2, wherein capturing the identification card comprises sending the captured biometrics information and the captured identification card information, marked as possible fraudulent activity, to a financial service provider.

4. The system of claim 3, wherein when the biometric verification passes, the operations further comprise:
   directing the customer to input supplemental information needed for a new card; and
   sending the supplemental information to a financial service provider.

5. The system of claim 1, wherein the customer request is a request for replacement of an existing transaction card.

6. The system of claim 1, wherein, the operations further comprise, if verification is successful:
   directing the customer to insert explanation information, the explanation information comprising one of an assertion that an existing card is damaged card or an assertion that the existing card is lost;
   supplying the explanation information to a financial service provider; and
   issuing a replacement transaction card.

7. The system of claim 1, wherein the identification card is a driver's license.

8. The system of claim 1, wherein the biometric data comprises at least one of fingerprint data, voiceprint data, facial recognition scan data, or a retinal scan data.

9. The system of claim 1, wherein verifying the captured identification and biometric data comprises at least one of:
   verifying overt features of the identification card, wherein the overt features comprise a signature;
   verifying covert features of the identification card, wherein the covert features comprise ultraviolet printing; or
   verifying microscopic features of the identification card, wherein the microscopic feature comprise a microprint.

10. A system for controlling issuing of an instant transaction card, comprising:
    at least one processor; and
    at least one memory storing instructions that, when executed by the at least one processor cause the system to perform operations comprising:
    receiving data captured by a card issuing system, the received data including identification data and a security level associated with an identification card of a customer;
    determining whether customer data corresponding to the received data is available in an internal database;
    when customer data corresponding to the received captured data is available in the internal database, determining whether the available customer data is sufficient to verify an identity of the customer;
    when the available customer data is not sufficient to verify customer identity, receiving biometric data from the card issuing system;
    determining whether a combination of the available customer data and the received biometric data is sufficient to verify customer identity; and
    when the combination data are sufficient to verify customer identity, sending the card issuing system instructions to issue a transaction card.

11. The system of claim 10, wherein:
    the received captured data comprises data captured form an identification card; and
    the received biometric data comprises biometric data captured by the instant card issuing system.

12. The system of claim 10, wherein the determination of sufficiency comprises:
    assigning a confidence value to a plurality of components of the customer data;
    calculating component confidence score based on the assigned values; and making a determination based on the component confidence score.

13. The system of claim 10, wherein when the available customer data is insufficient to verify customer identity, the operations further comprise:
   sending a request for a supplemental customer data to a third party verification system;
   receiving the supplemental customer data from the third party system; and
   combining the supplemental customer data with the available customer data.

14. The system of claim 10, wherein when the available customer data is insufficient to verify customer identity, the operations further comprise:
   sending a request to the instant card issuing system to collect biometric data;
   receiving the biometric data from the instant card issuing system; and
   storing the biometric data in the internal database.

15. The system of claim 10, wherein when the available customer data and the biometric data are insufficient to verify customer identity, the operations further comprise:
   sending instructions to the customer to contact a fraud department.

16. A system for customization of a transaction card, comprising:
   at least one processor; and
   at least one memory storing instructions that, when executed by the at least one processor cause the system to perform operations comprising:
      providing captured identification data and a security level associated with an identification card used to identify a customer;
      receiving, in response to the captured identification data and security level, instructions to issue a transaction card;
      receiving a customer request for customization of the transaction card;
      directing a customer to move to a designated area;
      capturing an image of the customer;
      displaying the image to the customer;
      requesting customer approval of the image; and
      upon receiving the approval, issuing a customized transaction card to the customer.

17. The system of claim 16, wherein operations further comprise:
   prior to requesting customer approval, displaying a plurality of pre made templated images to the customer; and
   receiving a customer selection of one of the pre made templated images.

18. The system of claim 16, wherein the operations further comprise:
   prior to requesting customer approval, receiving customer edits to the captured image; and
   modifying the captured image in accordance with the received customer edits.

19. The system of claim 18, wherein the edits comprise at least one of resizing or cropping the captured image.

20. The system of claim 19, wherein the operations further comprise:
   prior to modifying the captured image, confirming, by the system, a propriety of the edits by the system.

* * * * *